United States Patent
Waggoner

(10) Patent No.: US 9,472,012 B1
(45) Date of Patent: Oct. 18, 2016

(54) PERSPECTIVE-ENABLED LINEAR ENTERTAINMENT CONTENT

(71) Applicant: Amazon Technologies, Inc., Seattle, WA (US)

(72) Inventor: Charles Benjamin Franklin Waggoner, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 7 days.

(21) Appl. No.: 14/554,909

(22) Filed: Nov. 26, 2014

(51) Int. Cl.
G06T 15/00 (2011.01)
G06T 13/40 (2011.01)
G06T 19/00 (2011.01)
G06T 15/20 (2011.01)

(52) U.S. Cl.
CPC .............. G06T 13/40 (2013.01); G06T 15/00 (2013.01); G06T 15/20 (2013.01); G06T 15/205 (2013.01); G06T 19/00 (2013.01)

(58) Field of Classification Search
CPC ....... G06T 17/00; G06T 13/20; G06T 15/20; G06T 15/205; G06Q 10/00; H04S 3/00
USPC ............... 345/473, 474, 475, 418, 419, 427
See application file for complete search history.

(56) References Cited

U.S. PATENT DOCUMENTS

| | | | | |
|---|---|---|---|---|
| 7,221,366 B2 * | 5/2007 | Uyttendaele | .......... | G06T 15/205 345/427 |
| 7,606,375 B2 * | 10/2009 | Bailey | .......... | H04S 3/00 345/418 |
| 8,249,264 B2 * | 8/2012 | Bailey | .......... | H04S 3/00 345/418 |
| 8,613,646 B2 * | 12/2013 | Rogers | .......... | G06Q 10/00 463/1 |
| 8,866,809 B2 * | 10/2014 | McCarthy | .......... | G06T 15/20 345/419 |
| 9,147,277 B2 * | 9/2015 | Lanciault | .......... | G06T 13/20 |
| 9,240,073 B2 * | 1/2016 | Rao | .......... | G06T 17/00 |

OTHER PUBLICATIONS

"3-D iPad Head-Tracking App Now in App Store." WIRED, May 2011. 8 pp., downloaded Oct. 29, 2015.
Luban et al. "Turning a Linear Story into a Game: The Missing Link between Fiction and Interactive Entertainment." Gamasutra, Jun. 15, 2001. 3 pp., downloaded Sep. 26, 2014.
Molina, Brett. "Five burning questions about Amazon Fire smartphone." USA Today, Jun. 18, 2014. 3 pp., downloaded Nov. 3, 2014.

(Continued)

*Primary Examiner* — Phu K Nguyen
(74) *Attorney, Agent, or Firm* — Weaver Austin Villeneuve & Sampson LLP

(57) ABSTRACT

Techniques and systems are provided for providing linear entertainment content for perspective-shiftable displays. Some of the provided techniques and systems allow for pre-existing three-dimensional assets, such as models, scene definitions, virtual lights and cameras, motion paths, etc., that were used to create an original animated piece of linear entertainment content may be re-used and mapped, if necessary, into a format that is compatible with a perspective-shiftable display in order to re-create that same entertainment content in a perspective-shiftable format. In some instances where such pre-existing content is used, the technique may also include inserting additional content in locations that are only visible to the viewer when viewed from a perspective other than the perspectives used in creating the original animated piece of linear entertainment content.

24 Claims, 9 Drawing Sheets

(56) References Cited

OTHER PUBLICATIONS

"Multimedia." Wikipedia. 6 pp., downloaded Sep. 26, 2014.

Schneider, Mike. "Stop Arguing and Let's Make Us Some Non Linear Entertainment." Mar. 19, 2009. 6 pp., downloaded Sep. 26, 2014.

* cited by examiner

_US 9,472,012 B1_

PERSPECTIVE-ENABLED LINEAR ENTERTAINMENT CONTENT

BACKGROUND

Animated linear entertainment content, e.g., movies, serial TV shows, and other types of animated linear entertainment content, represents a significant portion of the worldwide entertainment content market. An increasing portion of such animated linear entertainment content is produced using three-dimensional (3D) modeling and animation assets. Recent instances of animated linear entertainment content that is sourced from 3D modeling and animation assets include, for example, Pixar films, such as Toy Story 3, Wall-E, and Up!, as well as Amazon Studios' (Amazon Studios is a subdivision of the assignee of this disclosure) Creative Galaxy, Annedroids, and Wishenpoof! episodic animated content.

Discussed herein are techniques and systems for producing improved animated linear entertainment content.

BRIEF DESCRIPTION OF DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals, e.g., reference numerals where the last two digits are in common, may designate corresponding elements throughout multiple figures.

DETAILED DESCRIPTION

Figure 1:
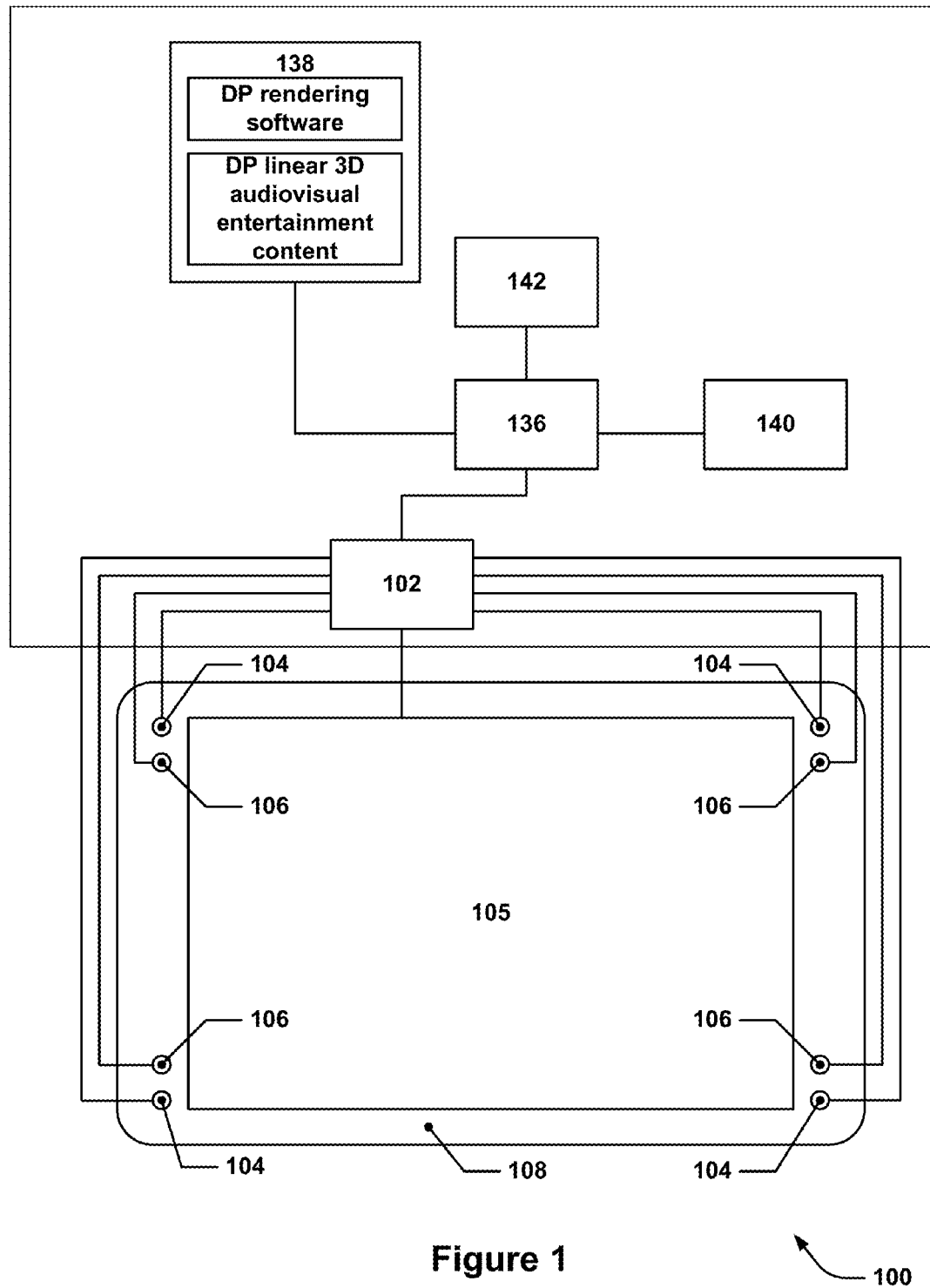
FIG. 1 depicts a high-level system diagram of a device with a DP display.

Multimedia entertainment content can generally be classed into linear and non-linear entertainment content. Linear entertainment content plays back with little or no navigational control by a person viewing the content, e.g., human intervention is generally not required once playback is initiated in order for the linear entertainment content to play from start to finish. For example, a movie or a video may be played back in response to an input received from a person (such as pressing selecting "play" on a DVD player or streaming content player on a computer), but, once started, the movie or video may generally play back in its entirety without requiring further interactions by a person (with some exceptions for hardware limitations, e.g., a movie that is too long to fit on one DVD may require the viewer to swap out DVDs halfway through—the viewer is not really interacting with the content when doing so, however). It is to be understood that while playback features such as pause, stop, rewind, fast forward, chapter skip forward/backward, reduce playback speed, and other standard playback controls found on modern content replay devices such as Blu-Ray players or streaming content players (such as Windows Media Player or web-based content players), the existence of such controls do not transform such linear entertainment content played back on such devices into non-linear entertainment content since they do not allow the viewer to actually interact with the content (instead, they allow the viewer to control aspects of the machine used to play back the content). Linear entertainment content may include, for example, videos, movies, and streaming broadcasts.

While most linear entertainment content requires no human interaction in order to progress towards a conclusion or end point, there is a subclass of linear entertainment content that provides periodic opportunities, e.g., branch points or decision points, for a person experiencing the linear entertainment content to interact with the linear entertainment content and, through such interaction, influence which of two or more different segments of linear entertainment content is played back for the person following the interaction. Linear entertainment content that consists of segments of linear entertainment content separated by such decision points is referred to herein as "branching linear entertainment content" or the like. There may be multiple such branch points within a given piece of branching linear entertainment content, some of which may only be presented to the viewer depending on prior branch point decisions, e.g., selecting a particular branch may foreclose a later opportunity to pursue a different branch. As discussed above, branching linear entertainment content is a sub-type of linear entertainment content. Linear entertainment content that is fixed, i.e., that does not have branch points (such as a typical feature film or television show), may be distinguished herein from branching linear entertainment content by referring to it as "fixed linear entertainment content," "non-branching linear entertainment content," or the like.

The present inventor has also conceived of a sub-type of branching linear entertainment content that provides aspects of both fixed and branching linear entertainment content. In this sub-type, which is referred to herein as "branching continuous linear entertainment content" or the like, the viewer is presented with opportunities to provide input to the linear entertainment content that influences which segment of linear entertainment is provided after the viewer input is received—this much, at least, is similar to normal branching linear entertainment content. In branching continuous linear entertainment content, however, one of the potential branches is specified as a default branch and, if no appropriate viewer input is received within a predetermined time interval, the linear entertainment content segment for the default branch is selected for playback. The window of time in which the viewer may provide such input may be contemporaneous with playback of the linear entertainment content, e.g., the viewer may be required to interact with the linear entertainment content in a particular manner within a predetermined time window, e.g., within 10 seconds prior to the branch point, while the linear entertainment is playing back, or the linear entertainment content may pause during the time window to allow the viewer to provide viewer input (if the viewer fails to provide the viewer input during the time window, then the linear entertainment content may resume playing using the linear entertainment content segment associated with the default branch). Both of these scenarios are viewed as examples of "branching continuous linear entertainment content" herein since the linear entertainment content in question would play through to completion regardless of whether the viewer provides any input that influences branching. Branching linear entertainment content that does not provide for such default branch selection and requires the viewer to make an affirmative selection of a branch before proceeding in further linear entertainment content segment playback may be referred to herein as "branching discontinuous linear entertainment content" or the like.

Non-linear entertainment content, by contrast, requires that the viewer interact with the entertainment content, generally in a relatively continuous manner, in order to progress through the entertainment content. Video games are examples of non-linear entertainment content. For example, a person playing a video game may be required to navigate a character through a three-dimensional virtual world and perform various interactions, e.g., unlocking doors, defeating enemies, engaging in dialog with non-player characters, etc., in the virtual world in order to advance the storyline being told by the non-linear entertainment content. If the player does not provide such interactions, then the storyline will not progress and person will not experience the non-linear entertainment content (or at least, will not discover the underlying storyline or storylines that the non-linear entertainment content is designed to convey). Modern examples of such video game non-linear entertainment content include first and third-person role-playing adventure games such as The Elder Scrolls: Skyrim, the Mass Effect series, and the Dragon Age series; first-person shooter games such as the Call of Duty and Modern Warfare franchises; and third-person real-time strategy games. In all of these video games, the player is largely responsible for continuously interacting with, and navigating through, the virtual environment in order to advance whatever storyline is embedded within the game. At times, non-linear entertainment content may use short segments of non-linear content in the form of expository "cut-scenes" in order to further develop the storyline being told in the video game. Such cut-scenes typically represent an extremely small fraction of the total video game experience, e.g., a player of a typical video game may spend 99% or more of their time interacting with the game and less than 1% of their time viewing such cut-scenes.

This disclosure is directed at linear entertainment content and, more specifically, towards computer-generated, linear audiovisual entertainment content based on 3D models and other 3D information. The techniques and systems discussed herein are envisioned as being particularly well-suited for use with fixed or non-branching linear entertainment content, but may also be quite applicable in the context of branching linear entertainment content, including both branching continuous linear entertainment content and branching discontinuous linear entertainment content. Such computer-generated, linear 3D audiovisual entertainment content may be generated by defining one or more 3D models (sometimes referred to as "meshes"), virtual lights, virtual cameras, animation paths or behaviors, and other parameters that may govern how a particular scene of computer-generated, linear 3D audiovisual entertainment content is to play out, and then rendering images of the 3D models in real-time from the perspective of one of the virtual cameras using the lighting, animation paths, and other parameters in order to determine how the virtual objects in the scene are to appear.

In the early days of computer-generated, linear 3D audiovisual entertainment content, such rendering was too complicated to be performed in real-time, and individual frames of an animation were rendered (a process lasting considerably longer than the each frame's screen-duration during replay) to a raster image format and then sequenced together in a raster video format, e.g., such as MPEG-1, MPEG-2, H.264, or other such format. While modern graphics processing units (GPUs) have increased in power, memory, and speed to the point where a large amount of 3D content may be rendered to a display in real-time with an impressive level of detail, most computer-generated, linear 3D audiovisual entertainment content is still produced by rendering the content to raster image files that are then stored in some form of widely-recognized, industry-standard raster video format (such as MPEG-1, MPEG-2, etc.). This allows for such computer-generated, linear 3D audiovisual entertainment content to be played back on a variety of devices, including devices that are not equipped with a GPU of sufficient capability to render the computer-generated, linear 3D audiovisual entertainment content in real-time. It also allows for such computer-generated, linear 3D audiovisual entertainment content to include content that it is not yet possible to render in real-time, e.g., animated content that requires extremely computationally-intensive processing, such as the motion of individual strands of hair or fur in the wind, the particle motion of water as it breaks over a reef, etc. As a result, computer-generated, linear 3D audiovisual entertainment content is still typically provided to the end user in a rasterized video format in the vast majority of cases, e.g., such as on DVDs or through streaming video broadcasts. A viewer's experience with a particular piece of traditional linear 3D audiovisual entertainment content will thus be the same regardless of whether it is the viewer's first or $100^{th}$ time watching the traditional linear 3D audiovisual entertainment content.

The present inventor has conceived of a new form of linear 3D audiovisual entertainment content that leverages unique capabilities of a relatively new display technology—dynamic perspective displays—in order to provide linear 3D audiovisual entertainment content that allows for the viewer to change the perspective used to present scenes in the linear 3D audiovisual entertainment content during playback of the linear 3D audiovisual entertainment content.

A dynamic perspective (DP) display is a display that is provided graphical output from a DP graphics processing unit (DPGPU) that is communicatively connected with one or more sensors that are configured to detect input indicating a two- or three-dimensional location relative to a particular reference frame. In some implementations, the one or more sensors may be provided by a touch-screen interface that tracks a touch input location relative to a reference frame, e.g., such as relative to the center of the display (in this example, the XY coordinates of the touch input with respect to the center of the display may provide the input to the DPGPU). In some implementations, the sensors may be head-tracking sensors, e.g., cameras, that track the location of a person's head relative to a frame of reference, e.g., a coordinate system located at the center of the DP display and having two axes aligned with orthogonal edges of the DP display (assuming that the DP display is flat and rectangular—although non-flat and/or non-rectangular DP displays may be used as well, recognizing that the coordinate system may be defined with respect to some other features of the apparatus) and a third axis normal to the DP display. The Amazon Fire Phone is one example of a device with a DP display and that includes such head-tracking sensor systems; by using four cameras located near the four corners of the DP display, the Fire Phone is able to triangulate the viewer's head position with respect to the DP display (including determining how far away the viewer's head is from the DP display). It is to be understood that while the examples and discussion provided herein may refer to determining DP according to the viewer's head position, such discussion can also be applied to DP systems that do not have head-tracking capability (recognizing, of course, that instead of head position, other input indicating a desired viewer perspective may be used instead, e.g., touchscreen input).

It is to be understood that the DP display may, in actual practice, be a standard display, e.g., a standard LCD, OLED, or other type of display technology. By connecting the DP display with the DPGPU, however, the DP display may be transformed into a display that has DP capabilities and is thus referred to herein as a "DP display." Moreover, it is also to be understood that the DPGPU may be provided by a discrete device, e.g., such as a purpose-built graphics controller chip, or by a combination of devices, e.g., a standard graphics controller chip coupled with a standard application processor that performs DP processing, via DP software routines executed by the application processor, prior to sending display instructions to the standard graphics controller chip. For example, in the Amazon Fire Phone, the DP display is a standard 4.7" LCD that is driven by an Adreno 330 GPU that is, in turn, controlled by a 2.2 GHz quad-core Qualcomm Snapdragon 800 CPU that executes the Fire Phone operating system and that provides the DP capabilities of the Fire Phone by executing DP processing subroutines.

The DPGPU may be configured to utilize the information received from the sensors to alter the perspective with which objects rendered by the DPGPU are shown. In the Amazon Fire Phone, for example, the perspective used to render various user interface features, e.g., user interface icons, three-dimensional models of buildings in a mapping program, and wallpaper images, may be adjusted based on the positioning of the viewer's head or face with respect to the display. For example, if the head-detection sensors indicate that a person viewing the DP display moves their head to the left-of-center with respect to the DP display, then the DPGPU may cause the perspective used to render an object on the DP display to rotate or move with respect to the object so as to view the "left" side of the object. If the person then moves their head back to a location centered in front of the display, then the DPGPU may cause the perspective used to render the object on the DP display to rotate or move in the opposite direction and show the "front" side of the object again. Similarly, if the person moves their head to a location located to the right-of-center with respect to the DP display, then the DPGPU may cause the perspective used to render the object on the DP display to rotate around the object so as to view the "right" side of the object. Thus, the point-of-view (POV) origin and the line-of-sight (LOS) that help define the perspective that is ultimately used to render the object to the DP display may continuously change as the viewer's head moves relative to the DP display.

FIG. 1 depicts a high-level system diagram of one example device with a DP display. Visible in FIG. 1 is a device 100 with a DP display, which may include a housing 108 that locates one or more head position sensors 104 relative to a display panel 105. The head position sensors 104 may, for example, be any sensor that may be used to sense the relative location of a viewer's head in front of the display with respect to the display panel 105, e.g., digital cameras, ultrasonic sensors, etc. If necessary, the head position sensors 104 may be augmented with additional hardware, e.g., infrared light sources 106 may be included to allow for head position sensing in darkness (if digital camera sensors are used that are sensitive to infrared light, then the infrared light sources may be turned on to illuminate the person's head—the digital cameras will be able to detect the infrared light reflected off of the viewer's head, but the viewer will not be able to see the infrared light since it is not in the visible spectrum). The head position sensors 104, display panel 105, and, if used, infrared light sources 106 may be communicatively connected with a DPGPU 102, which may control the head position sensors 104, receive head position data from the head position sensors 104, and use such head position data to determine what perspective to use when displaying content including 3D scenes and objects.

The DPGPU 102 may be communicatively connected with one or more processors 136 (or, in some cases, the functions performed by the DPGPU may simply be performed by the one or more processors 136, i.e., the DPGPU 102 and the one or more processors 136 may be the same or may split DP functionality between them, as is the case in the Fire Phone) that are also communicatively connected with non-volatile memory 138 and volatile memory 140. The memory 138 may store computer-executable instructions for controlling various aspects of the DPGPU 102 and for displaying DP content. For example, the memory 138 may store DP rendering software, e.g., software that may be used to render DP linear 3D audiovisual entertainment content, which may also be stored in the memory 138, on the DP display.

The one or more processors 136 may also be communicatively connected to a communications interface 142 of some sort, e.g., a wireless communications interface, a USB interface, etc., to allow data, such as the data stored in memory 138, to be transmitted to the device 100.

The present inventor realized that incorporating DP functionality into linear 3D audiovisual entertainment content may allow for a unique and novel entertainment format that is not possible using conventional display technologies. More specifically, the present inventor conceived of the idea of providing DP linear 3D audiovisual entertainment content that is rendered in real-time using a DPGPU that allows a viewer of the DP linear 3D audiovisual entertainment content to move their head relative to the DP display that is used to display the DP linear 3D audiovisual entertainment content (or otherwise indicate a desired user perspective) in order to change the perspective used by the DPGPU to present the DP linear 3D audiovisual entertainment content. The present inventor also realized that it would be possible, in many cases, to leverage existing 3D assets that were used (or intended to be used) to create rasterized or non-DP video versions of linear 3D audiovisual entertainment content, e.g., 3D models, motion paths, lighting definitions, etc., to produce such DP-enabled linear 3D audiovisual entertainment content. For example, 3D assets used to generate episodes of popular shows like Creative Galaxy, Annedroids, and Wishenpoof! may be used as source material for producing DP-enabled linear 3D audiovisual entertainment content.

The present inventor further realized that, during the creation of DP-enabled linear 3D audiovisual entertainment content using such existing 3D assets, the DP linear 3D audiovisual entertainment content may be further enhanced by inserting additional assets, e.g., special effects, additional 3D models, lighting, etc., into one or more scenes in the DP linear 3D audiovisual entertainment content. Such additional 3D assets may be inserted at virtual locations that may not be visible in a scene on a DP display when the scene is viewed according to the same perspective(s) as are used to present that same scene in the non-DP video version of the linear 3D audiovisual entertainment content. This allows viewers to engage in "Easter egg hunts," "treasure hunts," or "scavenger hunts" while watching the DP linear 3D audiovisual entertainment content, i.e., while the DP linear 3D audiovisual entertainment content is on-screen, the viewer may continually change the perspective with which the scenes are presented by moving their heads relative to the DP display in order to find or locate perspectives in which these additional 3D assets are visible to the viewer.

If additional assets are included in DP-enabled linear 3D audiovisual entertainment content, then, in some implementations, some limited degree of interactivity may be incorporated into the DP-enabled linear 3D audiovisual entertainment content. For example, if Easter eggs or other discoverable content is included, the DP-enabled linear 3D audiovisual entertainment content (or a software application that plays such content back) may be configured to monitor the perspectives used to display the scenes in the DP-enabled linear 3D audiovisual entertainment content (which may change responsive to viewer head movement) and to track the number and type of "Easter eggs" discovered. In some implementations, an Easter egg may be registered as being found when it is partially or wholly visible on the DP display, whereas in other implementations, the viewer may not only need to view the DP display from a viewing position that causes the Easter egg to be visible, but they may also need to interact with the Easter egg, e.g., touch a region of the DP display corresponding with the displayed Easter egg, in order to have the discovery of the Easter egg be registered. The number of Easter eggs discovered by the viewer during the playback of the DP-enabled linear 3D audiovisual entertainment content may thus be tracked, and some metric of performance regarding the viewer's success rate in finding the Easter eggs may be provided at the end of (or at various points during, or even continuously throughout) the DP-enabled linear 3D audiovisual entertainment content playback. In some implementations, the viewer's performance, as gauged by the metric, may be rewarded in some manner, e.g., by awarding a badge, providing access to new content in a related media product such as a computer or video game, etc. Such interactivity does not change the linear nature of the DP-enabled linear 3D audiovisual entertainment content, but does introduce a companion, interactive activity that may serve to provide a further level of user engagement with the DP-enabled linear 3D audiovisual entertainment content.

In some implementations featuring branching (either continuous or discontinuous) linear entertainment content, the discovery or unveiling of an Easter egg due to viewer interaction with the DP display may be used as a form of input that governs which linear entertainment segment is displayed next. For example, changing the perspective to reveal a particular "Easter egg" within a particular window of time, e.g., within a given scene, may cause a different segment of linear entertainment content to be played for the next scene than would normally be played.

The process of creating DP linear 3D audiovisual entertainment content may proceed in a manner that is largely similar to the process for creating traditional, non-DP linear 3D audiovisual entertainment content, albeit with some key differences. For example, an animator may define or obtain a number of 3D models and other assets and arrange them in a 3D virtual world or workspace. The animator may define motion paths that govern movement of the 3D models (or lights, virtual cameras, etc.) within the 3D virtual world, as well as define various other virtual elements such as lights, model deformations, visual effects, etc. As in the traditional linear 3D audiovisual entertainment content generation process, the animator may define a virtual camera, which is conventionally defined by parameters such as the POV origin (the point from which the virtual camera looks), the focal point (the point at which the virtual camera is pointed), the LOS (the vector along which the virtual camera looks), and/or the field-of-view (sometimes expressed in terms of focal length of the virtual lens of the virtual camera). Not all of these parameters need to be specified in every case—for example, if a POV origin and a focal point are provided, then these two data points inherently define the LOS and explicit definition of the LOS is thus not needed. If the POV origin is provided and the LOS specified, these parameters may define a plurality of potential focal points (all of which lie along the LOS). These parameters may be static, e.g., the virtual camera may remain motionless and have constant optical properties throughout a scene, or the animator may apply various rules to the parameters such that aspects of the virtual camera change during a scene. For example, the field-of-view (FOV) of the virtual camera may be defined such that it slowly decreases in viewing angle through a segment of a scene, causing a "zoom" effect. In another example, the POV origin may be moved along a POV motion path during a scene, causing the perspective for the scene to shift as the virtual camera is moved along the POV motion path. Alternatively, or additionally, the focal point may be moved along a focal point motion path so as to cause the virtual camera to focus on different areas of the virtual world (the LOS in this case may also shift accordingly such that, for any given animation frame, the LOS passes through the POV origin and through the focal point). From a practical standpoint, most animators define the perspective used for each scene using a POV origin and a focal point (the virtual camera is often centered on some virtual object in the scene, so it is often convenient to tie the focal point to that object). Regardless of how the animator chooses to specify the virtual camera settings, the end result is the same—a POV origin and LOS are established for the virtual camera, either explicitly or implicitly, by information provided by the animator.

When producing DP linear 3D audiovisual entertainment content, however, additional parameters are defined for the virtual camera that are not used in defining virtual cameras for non-DP linear 3D audiovisual entertainment content. These additional parameters include, for example, information that establishes a default POV origin, a default LOS, and a POV zone.

The default POV origin and the default LOS act as a frame of reference or anchor for the POV zone, and generally correspond with a "default" perspective that is presented by the DPGPU when a viewer's head is detected as being located at a centered location in front of a DP display (or, in non-head-tracking DP systems, with input indicating that the desired perspective is the default perspective). If existing 3D assets that were used to create a non-DP version of the linear 3D audiovisual entertainment content are re-purposed for use in creating the DP linear 3D audiovisual entertainment content, then the default POV origin may correspond to the POV origin that was used to define the virtual camera used in creating the non-DP linear 3D audiovisual entertainment content. Similarly, the default LOS may correspond to the LOS that was used to further define the virtual camera used in creating the non-DP linear 3D audiovisual entertainment content. The default POV origin, in combination with the default LOS, may generally define the perspective that the DPGPU displays when a viewer's head is positioned in a centered location in front of the DP display (or when other input from a viewer, e.g., touch input on a touchscreen in a non-head-tracking DP system, indicating a desired perspective correlates with such a position).

When a scene in DP linear 3D audiovisual entertainment content is displayed on a DP display and the viewer moves their head away from the "default" position (e.g., centered in front of the DP display), then the DPGPU may cause the POV origin and LOS used to generate the displayed perspective to move or shift from their default location and direction, respectively. For convenience, the POV origin and the LOS that are actually used to determine the displayed perspective on a DP display at any given moment in time (and that are both able to be altered in response to changes in viewer head position) are referred to herein as the "dynamic POV origin" and the "dynamic LOS," respectively. Thus, the dynamic POV origin and the dynamic LOS define the perspective used to render the scene on the DP display. For example, if the viewer moves their head left-of-center, then the dynamic POV origin may be similarly "moved" left of the default POV origin. Similarly, if the viewer moves their head right-of-center, then the dynamic POV origin may be moved to the right of the default POV origin. The default POV origin may thus serve as the "ideal" or "intended" POV origin from which the animator originally intended the scene to be viewed, but the viewer may be empowered to move the dynamic POV origin (by moving their head relative to the DP display) so that perspectives other than the "ideal" or "intended" perspective may be observed. Like the POV origin for non-DP linear 3D audiovisual entertainment content, the default POV origin may be defined so as to be stationary or may be defined so that it follows a POV motion path.

At the same time that the dynamic POV origin is being virtually moved in a DP display, the dynamic LOS may also be re-oriented as well. Thus, each potential location that the dynamic POV origin may be moved to may have an associated dynamic LOS that governs the direction in which the virtual camera used to render the scene is pointed at for that particular location of the dynamic POV origin. The dynamic POV and the dynamic LOS are both determined according to the same viewer input, e.g., XY or XYZ location of the viewer's head with respect to the DP display (or XY location of a touchscreen input, if a non-head-tracking DP display is used), and are thus essentially coupled with one another. Put another way, each dynamic POV origin and the dynamic LOS associated with that dynamic POV origin for a given frame are linked.

While the default POV origin may be analogized to the POV origin of non-DP linear 3D audiovisual entertainment content, and the default LOS to the LOS of the same, the POV zone does not have any corollary in non-DP linear 3D audiovisual entertainment content. As discussed above, the dynamic POV origin may be moved relative to the default POV origin responsive to changes in detected viewer head position relative to the DP display. The POV zone refers to a volume, surface, line, path, or other bounded region within which, or along which, the dynamic POV origin may be moved responsive to such detected viewer head movement. There are a number of ways in which the POV zone may be defined, and this disclosure is to be understood as not being limited to any particular manner of defining a POV zone. Several examples of POV zones are discussed later in this disclosure. The orientation of the POV zone with respect to the default POV origin and the default LOS may be specified by the animator, e.g., it may be specified such that it may change over time (thus providing different ranges of potential allowable movement of the dynamic POV origin with respect to the default POV origin over time) or may be relatively fixed. For example, the POV zone for a particular visual scene in the DP linear 3D audiovisual entertainment content may be set to always maintain the same relative positioning with respect to the default POV origin and the same relative orientation with respect to the default LOS. Thus, if the default POV origin and the default LOS change over time within a given visual scene, such as may be the case if the virtual camera follows a motion path and/or rotates about its origin during the visual scene, the POV zone may move and/or rotate in a manner consistent with the locations of the default POV origin and the orientations of the default LOS during the visual scene.

A POV zone may be defined explicitly, such as by having the animator draw or otherwise graphically define a surface or volume that represents the space within which the dynamic POV origin may be moved. In another example, a POV zone may be defined based on parameters that govern how detected viewer head position is translated into corresponding movement of the dynamic POV origin. For example, a device having a DPGPU and DP display may be configured to determine how far a viewer's head has moved off-axis (in terms of angular motion about the center of the DP display with respect to an axis normal to, and centered on, the DP display) and then cause the dynamic POV origin to rotate by that same amount about a point in the visual scene. Such a scenario will typically inherently limit the POV zone since the angular position of the viewer's head relative to the center axis will likely be unable to be determined if it exceeds a certain amount (for example, if the DP display utilizes cameras to detect viewer head position, if the viewer moves their head out of the cameras' fields of view, then the DP display will be unable to provide any head position measurement), although explicit limits on such translation functions may also be used to limit the total amount of dynamic POV origin movement permitted. It is to be understood that the POV zone may be defined according to rules or mappings that result in a non-linear translation of the dynamic POV origin in response to linear changes in detected head position (or vice versa), e.g., initial movements of a viewer's head away from the "default" location may result in relatively large movements of the dynamic POV origin, whereas continued movement of the viewer's head away from the default location may result in a smooth "ramping down" of the corresponding movement of the dynamic POV origin in the virtual world. This may prevent the dynamic perspective view from slamming to a stop as the dynamic POV origin approaches the limits of the POV zone.

In some implementations, the animator may specify various rules that govern exactly how the detected viewer head location is translated into relative movement of the dynamic POV origin with respect to the default POV origin. For example, the animator may define various parameters that cause each degree of angular movement of the viewer's head about the center of the DP display to result in 0.5° of "virtual" movement of the dynamic POV origin about the focal point.

In other implementations, the animator may define other limits that establish boundaries on how far the dynamic POV origin is allowed to move responsive to viewer head relocation (and thus the extent of the POV zone). For example, the animator may set a parameter that limits dynamic POV origin movement to ±45° along a "horizontal" arced path centered on a particular point (thus, the viewer may rotate the perspective used up to 45° to the right or up to 45° to the left, but cannot rotate the view up or down and cannot rotate the view beyond 45° to either side). The POV zone, in this example, would thus consist of a 90° segment of arc, centered on the point. In a further such implementation, the animator may relax such parameters such that the dynamic POV origin may be rotated up to 45° to the left or right about the point, and also up to 45° up or down about the point. In such cases, the POV zone may take the form of a partial spherical surface centered on the point. It is to be understood that any combination of parameters or rules may be used to govern exactly what the bounds are for the POV zone, and all such potential techniques for establishing a POV zone are intended to fall within the scope of this disclosure.

In addition to information that establishes the POV zone, a further parameter that may be defined when producing DP linear 3D audiovisual entertainment content is information that establishes the mapping for determining the dynamic LOS that corresponds with each potential location of the dynamic POV origin within the POV zone. This mapping may take any number of forms, but may typically consist of one or more rules or functions that provide output that allows the dynamic LOS to be determined for any given potential dynamic POV origin.

For example, one potential such mapping is a rule that defines a "focal point" in the virtual world that, in combination with the dynamic POV origin, defines the dynamic LOS (two points define a line). The focal point, in this example, is not affected when the dynamic POV origin moves. Thus, while the dynamic POV origin is free to move within the POV zone responsive to viewer input, the dynamic LOS will always (in this example) be oriented such that focal point is centered in the DP display. Of course, other mappings, including ones that do not explicitly define a focal point, may be used to achieve the same visual effect; such alternative mappings are also considered to be within the scope of this disclosure.

The focal point, if used, may often be defined to be near or within a particular object in the visual scene. This causes the object to remain in the center of the rendered view. However, in some cases, the focal point may be located "in front of" or "behind" such an object. This may have the effect of causing the object to move into or out of the rendered view of the visual scene, depending on the particular location of the dynamic POV origin and the orientation of the dynamic LOS.

In further implementations, the mapping may also include a rule that governs movement of the focal point in line with movements of the dynamic POV origin. For example, the focal point may, in effect, move along the default LOS, e.g., move closer to the default POV origin as the dynamic POV origin moves away from the default POV origin, and move further from the default POV origin as the dynamic POV origin moves closer to the default POV origin.

It is to be understood that there is considerable flexibility in how the various mappings discussed herein may be established. While various examples have been provided, this disclosure is not be read as being limited to just these examples, and is intended to encompass other types of mappings that may be used to similar or related effect.

While the above examples have focused on changing viewing angle in DP linear 3D audiovisual entertainment content responsive to viewer head movement, another aspect of perspective that may be modified based on viewer head movement is the FOV of the virtual camera used to render the visual scene for DP output. As with the default POV origin and the default LOS, a default FOV may be established for a visual scene; if pre-existing assets are used to generate the scene, then the FOV may be inherited from the virtual camera settings defined in those pre-existing assets. During DP playback, however, the visual scene may be rendered according to a dynamic FOV, which may be altered from the baseline default FOV according to viewer head positioning relative to the DP display. For example, if the viewer moves their head closer to the DP display, then, in some implementations, the dynamic FOV may be narrowed, whereas the dynamic FOV may be increased as the viewer moves their head further from the DP display. In implementations involving dynamic FOV, further information establishing a mapping of dynamic FOV to head position information may also be defined for DP linear 3D audiovisual entertainment content. One example of such mapping may be a rule that causes the dynamic FOV to linearly decrease to 50% of the viewing angle of the default FOV as the viewer's head position moves from 2 ft away from the DP display up to 1 ft away from the DP display (thus magnifying the view), and to linearly increase to 200% of the viewing angle of the default FOV as the viewer's head position moves from 2 ft away from the DP display to up to 3 ft away from the DP display (thus zooming out the view). Other such mappings are, of course, possible as well. Such FOV mappings may be expressed in a variety of other manners as well, and all of these alternative implementations are considered to be within the scope of this disclosure.

Figure 2:
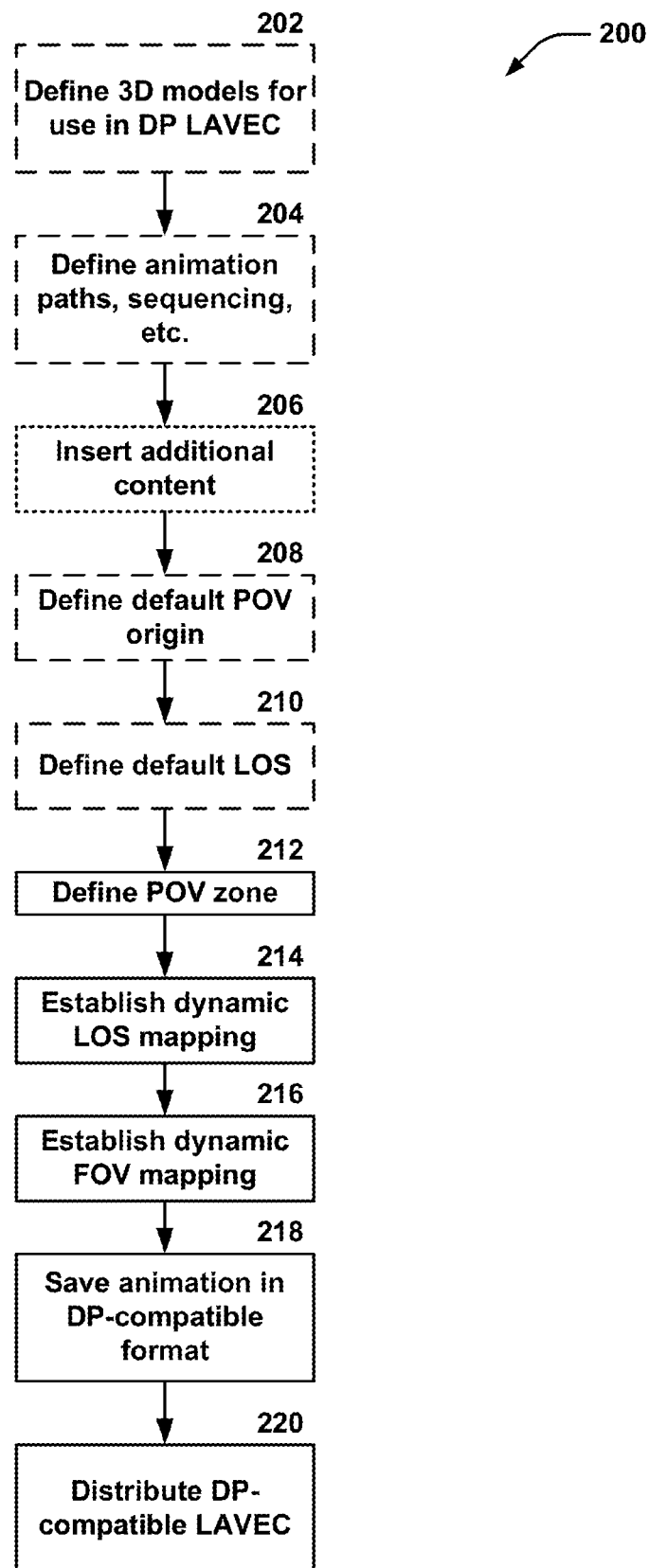
FIG. 2 depicts a flow diagram for a technique for creating DP linear 3D audiovisual entertainment content.

FIG. 2 depicts a flow diagram for a technique for creating DP linear 3D audiovisual entertainment content. In FIG. 2, the technique 200 begins with the definition of one or more 3D models in block 202. If pre-existing 3D models used to create non-DP linear 3D audiovisual entertainment content (LAVEC) are to be leveraged, then block 202 may include simply obtaining a copy of such models. If pre-existing models do not exist, then they may be created using any suitable 3D modeling program.

In block 204, various other elements needed to produce a scene in the DP linear 3D audiovisual entertainment content may be defined with respect to the 3D models, including, for example, animation or motion paths, virtual light definitions, textures, special effects, etc. Again, if pre-existing 3D assets used to create non-DP linear 3D audiovisual entertainment content are to be leveraged, then block 204 may include simply obtaining a copy of such assets and importing them into the program that is being used to define the DP linear 3D audiovisual entertainment content.

In block 206, which is optional, additional content may be inserted into the virtual 3D workspace in which the DP linear 3D audiovisual entertainment content scene is being defined. Such additional content, as discussed earlier, may be inserted at virtual locations within the 3D virtual world such that the additional content is hidden from view when the DP linear 3D audiovisual entertainment content is ultimately viewed from a default viewing position. Such additional content may be used, as mentioned earlier, to provide an "Easter egg hunt" activity for viewers to engage in while watching the DP linear 3D audiovisual entertainment content.

Similarly, in block 208, one or more default POV origins may be defined for the scene in question (if there are multiple viewing angles chained together one after the other in the scene, each may have a separate default POV origin). As discussed above, the one or more default POV origins may be drawn from existing animation assets, e.g., the POV origins used to define virtual camera locations for non-DP linear 3D audiovisual entertainment content creation may be re-used to define the default POV origins for use in DP linear 3D audiovisual entertainment content creation.

In block 210, one or more default LOSs may be defined (one for each default POV origin defined in block 208) for the scene in question. As discussed above, the default LOSs may be drawn from existing animation assets, e.g., extracted from the POV origin used in the pre-existing assets in combination with, for example, a viewing target or focal point used in the pre-existing assets.

Blocks 202 through 210, with the exception of block 206, may have counterparts in the creation process for non-DP linear 3D audiovisual entertainment content. The remaining blocks in FIG. 2, however, represent activities having no corollary in the creation process for non-DP linear 3D audiovisual entertainment content.

In block 212, a POV zone associated with each default POV origin used in a scene may be defined or established. As discussed earlier, such definition may be performed in any number of ways. The POV zone establishes the limits of how far the dynamic POV origin may be moved responsive to changes in detected viewer head position by a DP display and may also define how the detected changes in viewer head position are translated into corresponding dynamic POV origin movement. Block 212 includes activities that are not performed at all in the non-DP linear 3D audiovisual entertainment content creation process.

In block 214, information establishing dynamic LOS mapping may be defined. As discussed elsewhere in this disclosure, the dynamic LOS mapping may be established in a number of ways, including through rules or functions, geometric constraints, etc.

Similarly, in block 216, information establishing dynamic FOV mapping may be defined, if desired. As discussed earlier in this disclosure, the dynamic FOV mapping may be established in a number of ways, similar to how the dynamic LOS mapping may be defined.

In block 218, the animated scene or scenes being defined may be saved in a DP-compatible format, i.e., a format that preserves most or all of the three-dimensional characteristics of the 3D assets involved in blocks 202 through 216. As part of saving in such a format (or prior to, if desired), various scripts and conversions may be performed in order to transform the linear 3D audiovisual entertainment content into a format that is compatible with real-time rendering on a DP display, e.g., texture size may be decreased, mesh complexity simplified, etc.

In block 220, the saved DP-compatible format may be distributed to DP-enabled devices, e.g., an Amazon Fire Phone or a similar device, for later playback.

It is to be understood that most, if not all, of the actions discussed above with respect to FIG. 2 may be automated, especially when pre-existing 3D assets are leveraged. For example, various scripts, translators, converters, etc. may be written and used to transform existing 3D assets into a format that is compatible with a DP display. In such scenarios, the only human input that might be required would be to specify the parameters that are specific to DP features, such as the extent of the POV zone, mapping of viewer head movement to dynamic POV origin movement, dynamic LOS mapping, dynamic FOV mapping, etc. If desired, even these parameters may be automatically specified, e.g., using default values or rule-based settings and applied using scripts or other types of automated software routines.

Figure 3A:
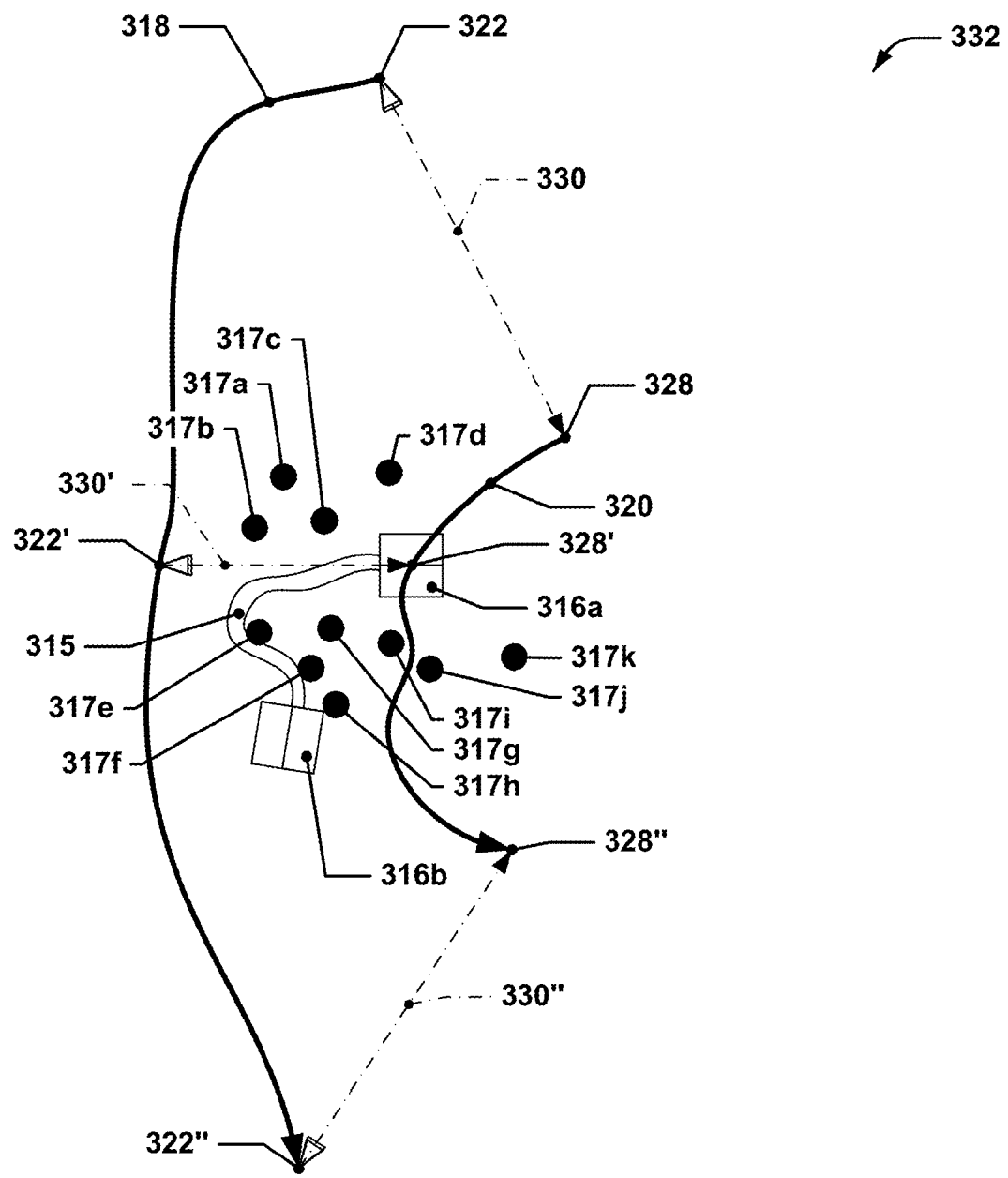
FIG. 3A depicts a plan view of an example 3D workspace or virtual world with various elements used to create non-DP linear 3D audiovisual content.
Figure 3B:
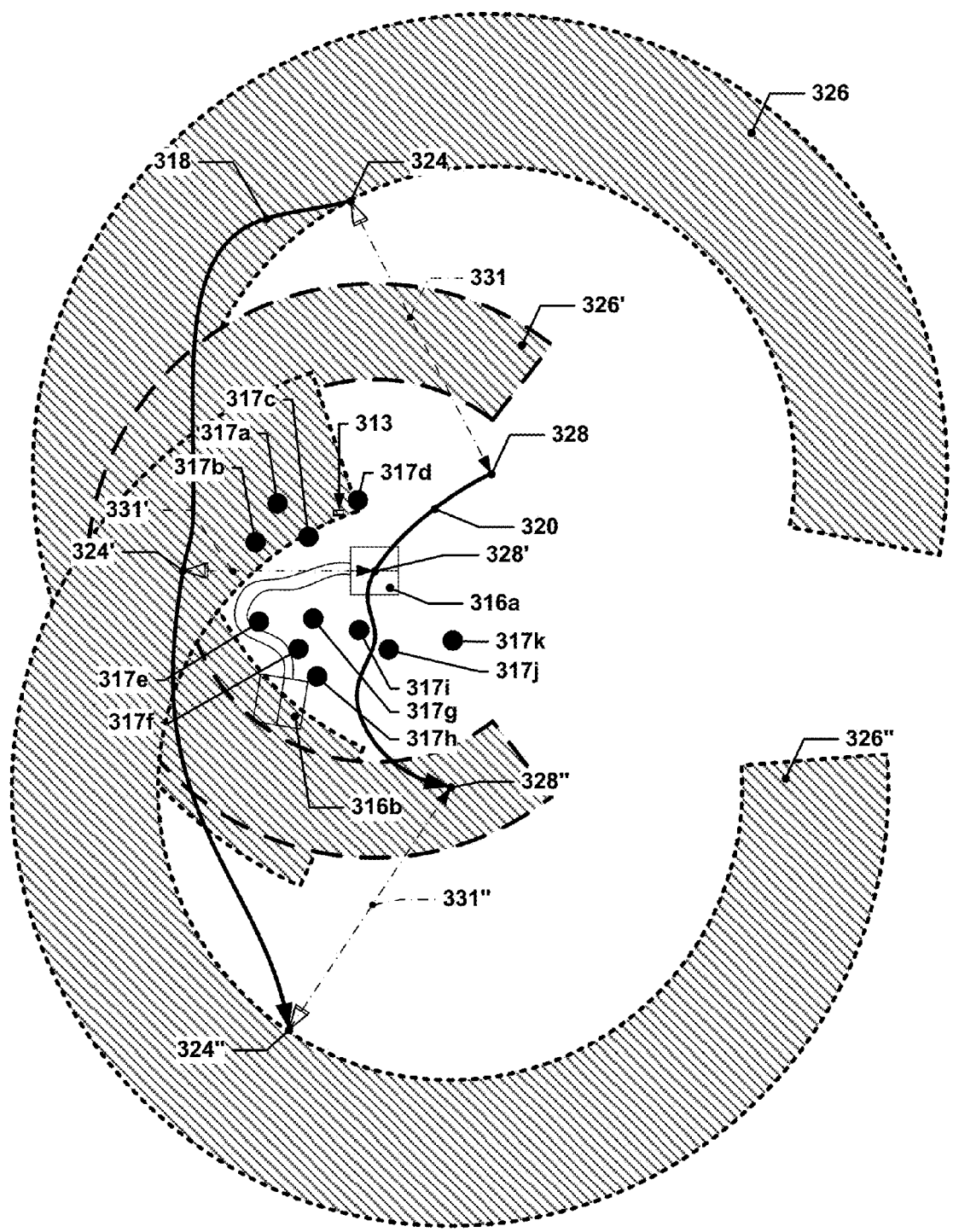
FIG. 3B depicts a plan view of the example 3D workspace or virtual world of FIG. 3A, but with additional elements used to provide DP functionality indicated.
Figure 3C:
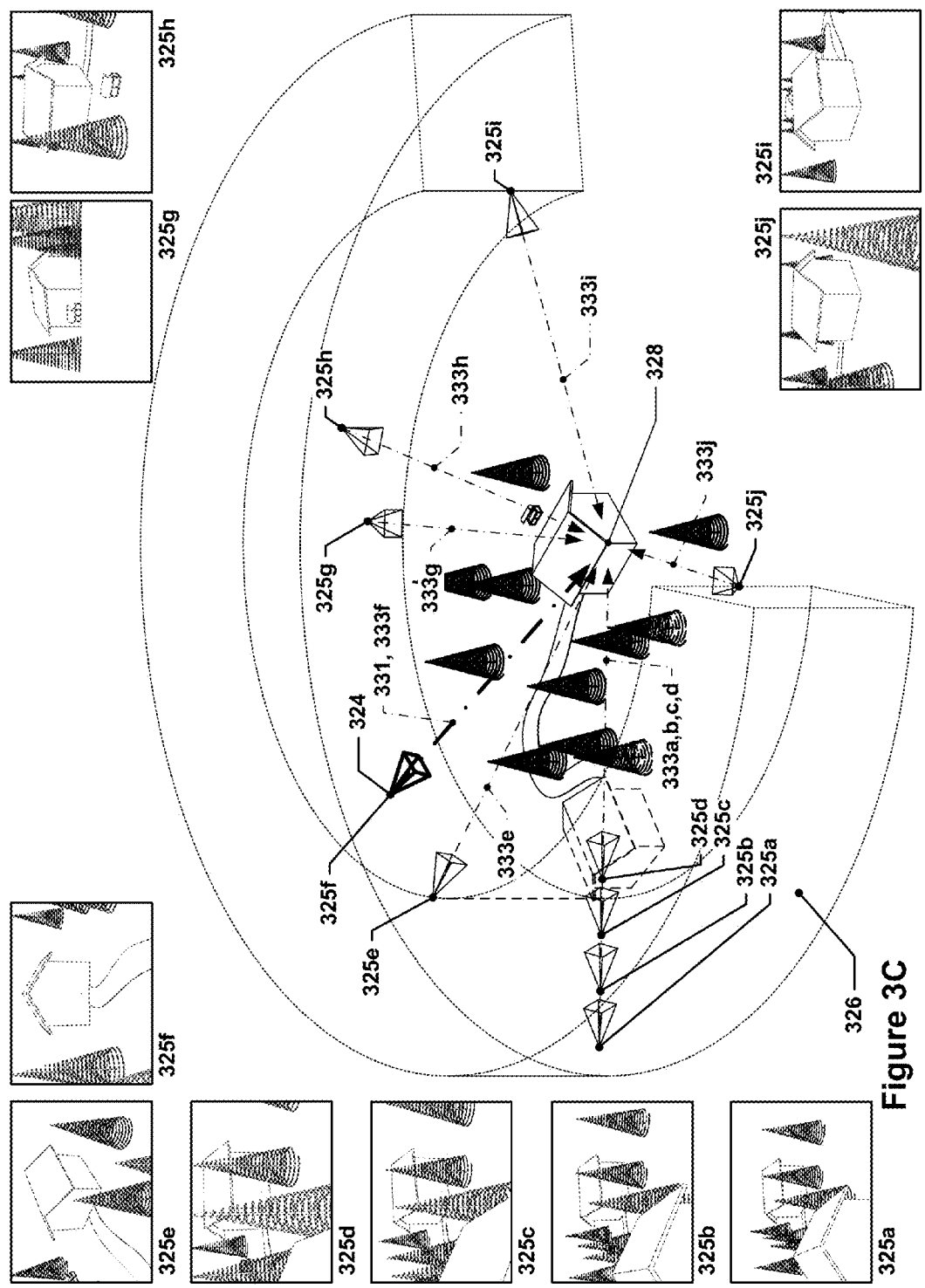
FIG. 3C depicts an off-angle three-dimensional view of the 3D workspace or virtual world of FIG. 3B, as well as inset images of the virtual world taken from various perspectives indicated in FIG. 3C.

While much of the above discussion has been provided with reference to only a few figures, the following discussion refers to various graphical aids that may provide enhanced understanding or clarity regarding the discussion herein. FIGS. 3A through 3C depict various examples of a 3D workspace or virtual world.

In FIG. 3A, a plan view of a 3D workspace or virtual world 332 is shown; this view may be similar to what an animator may see when defining DP or non-DP linear 3D audiovisual entertainment content under some conditions. Visible in workspace 332 are several 3D models—two models of a house (316a & 316b), a model of a path 315 connecting the two house models 316a and 316b, and 11 models of trees 317a through 317k (the trees are represented by conic helixes in the Figures, but appear as black circles when viewed from "above"). Also visible in workspace 332 are two motion paths—a POV motion path 318 and a focal point motion path 320. The POV motion path 318 may serve as a guide along which a POV origin 322 (each POV origin shown in this Figure and following Figures includes a pyramid-like FOV indicator showing the approximate field of view for each POV origin; these FOV indicators are simply for reference) may move from one frame to the next; similarly, the focal point motion path 320 may serve as a guide along which a focal point 328 may move along from one frame to the next. An LOS 330 is established between the POV origin 322 and the focal point 328; the LOS 330 indicates the direction along which the virtual camera that is located at the POV origin 322 will look in order to provide the perspective used to render that scene for that animation frame. Also included in FIG. 3A are two additional sets of POV origins 322, focal points 328, and LOSs 330 (indicated using single-, and double-prime indicators); these additional sets of POV origins 322, focal points 328, and LOSs 330 represent instantaneous locations/representations of these items for two additional points in time during the scene in question. As can be seen, as the animation progresses, the perspective used to present the scene in question may change over time, but it is constrained to follow a particular path and not allow any deviation therefrom.

FIG. 3B depicts a similar workspace 332 as that shown in FIG. 3A, and also shows the same POV motion path 318 and focal point path 320, as well as the same models 316a through 316c, etc. The workspace shown in FIG. 3B, however, includes further elements that support creation of DP linear 3D audiovisual entertainment content. For example, FIG. 3B depicts a default POV origin 324, which is constrained to follow the POV motion path 318 in the same manner as the POV origin 322 of FIG. 3A was. Also visible in FIG. 3B is POV zone 326, which is C-shaped (with a default LOS 331 bisecting the C-shape) and centered on the default POV origin 324. During DP playback, shifts in the viewer's head location relative to the DP display may cause the DPGPU to move the dynamic POV origin from the default POV origin 324 to other locations on/in the POV zone 326. FIG. 3B also depicts two additional sets of default POV origins (324' and 324"), default LOSs (331' and 331"), and POV zones (326' and 326"). As can be seen, the POV zones 326 move with their respective default POV origins 324 and change orientation according to their respective default LOSs 331. Furthermore, in this particular example, the POV zones are defined so as to scale based on the distance between the focal point 328 and the default POV origin 324 that define the default LOS 331 for each corresponding POV zone 326—thus the POV zones 326 and 326″ are both larger than the POV zone 326′. In other examples, however, the POV zone 326 may stay the same size.

A further addition to FIG. 3B as compared with FIG. 3A is Easter egg 313, which is, in this example, a treasure chest 3D model that has been added to the virtual world and that was not present in the virtual world of FIG. 3A.

FIG. 3C depicts an off-angle view of the same workspace as in FIG. 3B, but with the default POV origin 324, default LOS 331, POV zone 326, and the focal point 328 repositioned in locations associated with a different frame (in this case, corresponding with the frame associated with default POV 324′ in the previous Figures). Not shown in FIG. 3C are the motion paths and additional default POV origins, default LOSs, focal points, and POV zones of FIGS. 3A and 3B. As discussed, a dynamic POV origin may be moved about throughout the POV zone 326 responsive to data indicating changes in viewer head position relative to the DP display. Various potential locations within the POV zone 326 to which the dynamic POV origin may be moved are shown (these are simply a small subset of the potential locations within the POV zone 326 where the dynamic POV origin may be moved). In this example, the POV zone 326 is a volumetric region, i.e., the dynamic POV origin may be moved along X, Y, and Z axes within the POV zone.

To aid in understanding how DP linear 3D audiovisual entertainment content may provide a superior entertainment experience to non-DP linear 3D audiovisual entertainment content, a number of different locations for the dynamic POV origin are shown in FIG. 3C, along with associated renderings of what would be displayed on a DP display if input were provided to the device having the DP display that caused the dynamic POV origin to be moved to such locations. In actual practice, the dynamic POV origin would actually only occupy one of these locations at a time and not all of them simultaneously, as shown in FIG. 3C. For convenience, each dynamic POV origin and the corresponding rendering of the visual scene associated with that dynamic POV origin are referred to using a common reference number in this Figure; this convention is also followed in subsequent Figures in this disclosure. In this particular example, the information mapping the corresponding dynamic LOS associated with each dynamic POV origin causes each dynamic LOS to converge on a common point (designated by focal point 328) located within the house 316a.

Each dynamic POV origin in this example is indicated using the indicator 325 followed by a different lower-case letter. The dynamic LOSs that correspond with each dynamic POV origin are indicated by the indicator 333 followed by the same lower-case letter used for the corresponding dynamic POV origin.

Dynamic POV origin 325f is positioned at the same location as the default POV origin 324, and looks along a dynamic LOS 333f, which corresponds with the default LOS 331. From this perspective, the viewer is presented with an image of one of the houses in the scene (house 316a, to be specific).

In this example, as the viewer of the DP display moves their head to the left of the DP display center, the dynamic POV origin may swing around the house 316a in a clockwise manner. Dynamic POV origins 325h and 325i illustrate potential locations for the dynamic POV origin during such movement; dynamic POV origin 325i is at the edge of the POV zone 326 and thus represents the furthest extent that the dynamic POV origin may move in this direction. As can be seen, the "Easter egg" 313 is clearly visible to the viewer from the dynamic POV origin 325h (see inset) looking along the dynamic LOS 333h. Additionally, the top of the second house 316b may be seen peeking over the top of the first house 316a from the dynamic POV origin 325i. Neither of these objects is visible from the default perspective of the default POV origin 324.

If the viewer instead moves their head to the right of the DP display center, the dynamic POV origin may instead swing around the house 316a in a counter-clockwise manner. Dynamic POV origins 325d and 325j illustrate potential locations for the dynamic POV origin during such movement. The dynamic POV origin 325j is at the opposite limit of the POV zone 326 from the dynamic POV origin 325i, whereas the dynamic POV origin 325d is a symmetric counterpart (with respect to the midplane of the POV zone 326 running through the default LOS 331) of the dynamic POV origin 325h.

Dynamic POV origins 325a, 325b, and 325c illustrate further dynamic POV origins that lie along common dynamic LOSs 333a/b/c/d. For example, the POV zone and the mapping that transforms detected viewer head position changes into corresponding movement of the dynamic POV origin may cause the dynamic POV origin to move closer to, or further from, the objects in the visual scene depending on how close or far the viewer's head is positioned with respect to the DP display. If the FOV is kept fixed (as is the case in these examples), then this has the effect of panning the virtual camera in or out along the viewing axis so that the rendered view changes as is shown in the corresponding rendered images for the dynamic POV origins 325a, 325b, 325c, and 325d. In some implementations, instead of moving the dynamic POV origin in such cases, the mapping the transforms the viewer head position changes into corresponding movement of the dynamic POV origin may move the dynamic POV origin in response to left/right or up/down translation of the viewer head position with respect to the DP display center, but may instead change the FOV of the virtual camera located at the dynamic POV origin in response to head position changes in directions normal to the DP display, e.g., zoom the virtual camera in or out, depending on in which direction the detected head movement occurs.

Two additional dynamic POV origins 325e and 325g are also shown. The dynamic POV origin 325e is located at the top of the POV zone 326 and thus presents an elevated perspective on the visual scene. The dynamic POV origin 325g is located at the bottom of the POV zone 326 and thus presents a ground-level perspective on the visual scene (the Easter egg 313 is also visible from this POV origin).

As noted above, FIG. 3C illustrates various DP perspectives within a single frame of an animation. The actual perspective used to display the DP linear 3D audiovisual entertainment content will, in many cases, change over time as the default POV origin, default LOS, and the POV zone adjust to accommodate different camera angles and motions (such as following the motion paths discussed above with respect to FIG. 3A), even if the viewer maintains a fixed head position with respect to the DP display. This is because the positioning of the dynamic POV origin (and, in some cases, the dynamic LOS orientation) is determined with respect to the default POV origin (and, in some cases, default LOS) at each particular instant in time. Thus, as the default POV origin and the default LOS change over time, the dynamic POV origin and the dynamic LOS will experience corresponding changes. The dynamic LOS will always be at least partially defined by the dynamic POV origin, although the mapping that relates the dynamic LOS to the dynamic POV origin location may also reference other elements that move with the POV zone or may reference elements that are positioned independently of the POV zone. In this example, the mapping that defines the dynamic LOS for the depicted dynamic POV origins involves defining the dynamic LOS with respect to the corresponding dynamic POV origin as well as a fixed point in the virtual world, i.e., an element that is defined independently of the movement of the dynamic POV origin.

As can be seen, DP linear 3D audiovisual entertainment content provides the viewer with the potential for a considerably different viewing experience of a scene than may be experienced when viewing non-DP linear 3D audiovisual entertainment content.

Figure 4:
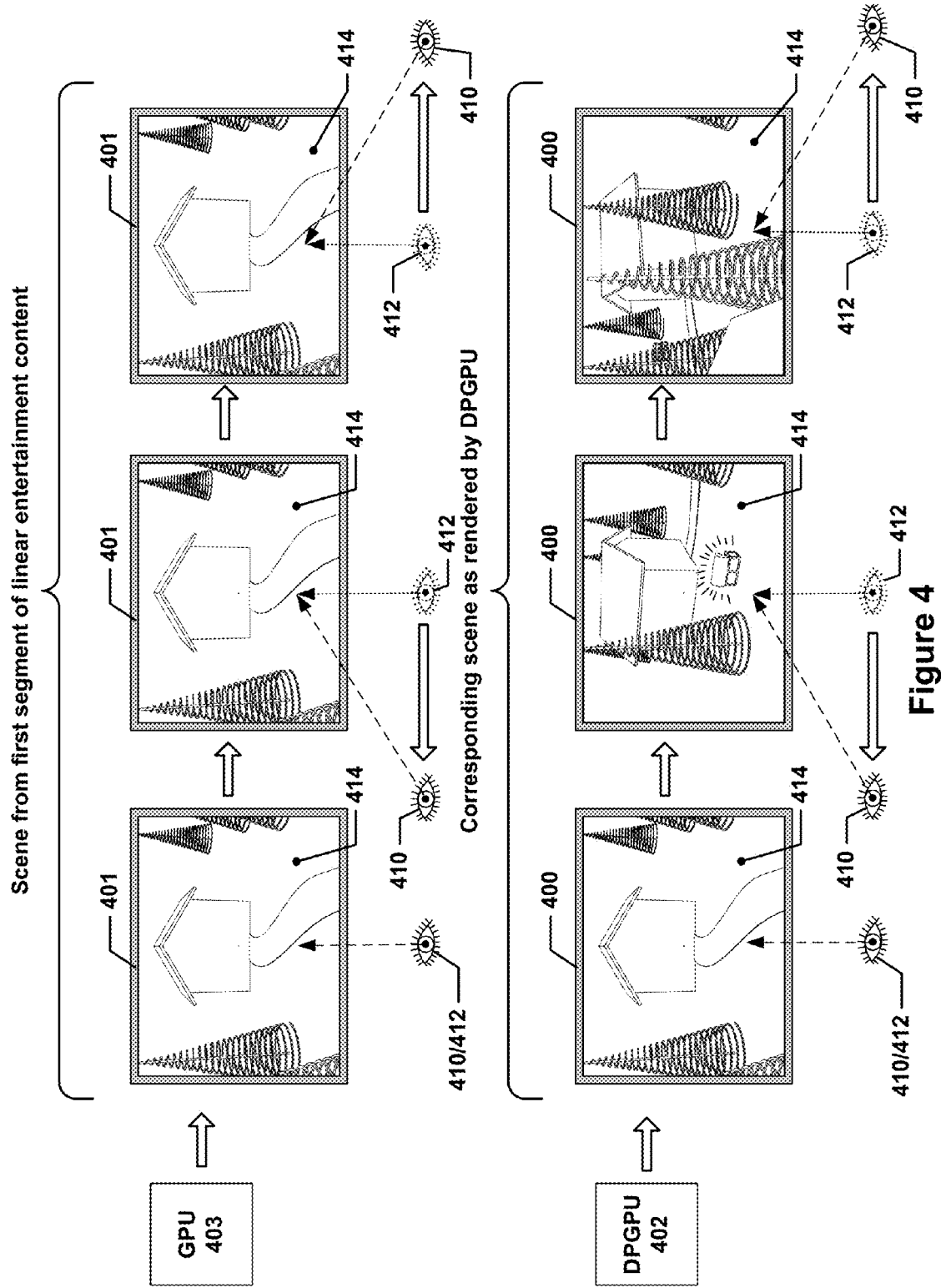
FIG. 4 provides a further comparison between non-DP linear 3D audiovisual entertainment content and DP linear 3D audiovisual entertainment content.

FIG. 4 provides a further comparison between non-DP linear 3D audiovisual entertainment content and DP linear 3D audiovisual entertainment content. Shown in the top half of FIG. 4 is a set of non-DP linear 3D audiovisual entertainment content frames as shown on a display 401 that is driven by GPU 403 (the scene shown corresponds to the scene from the default POV origin 324 of FIG. 3C). Shown in the bottom half of FIG. 4 is a corresponding set of DP linear 3D audiovisual entertainment content frames as shown on DP display 400, which is driven by DPGPU 402. In the frames shown, there is no actual movement of the default POV origin or the default LOS.

Also shown in FIG. 4 are viewing positions 410 (represented by an eye symbol) associated with a viewer's head. In the left-most frame shown for both the DP and non-DP linear 3D audiovisual entertainment content, the viewing positions 410 are shown as being centered in front of the DP display 400 and the display 401, respectively. These viewing positions 410 may also correspond to a default viewing position 412. In the middle frame shown for both the DP and non-DP linear 3D audiovisual entertainment content, the viewing positions 410 have been shifted to the left of the default viewing position 412, and in the right-most frame shown for both the DP and non-DP linear 3D audiovisual entertainment content, the viewing positions 410 have been shifted to the right of the default viewing position 412.

As can be seen, the scene 414 that is shown in all three frames of non-DP linear 3D audiovisual entertainment content remains unchanged regardless of where the viewing position 410 is with respect to the display 401. In contrast, the scene 414 that is shown in each frame of DP linear 3D audiovisual entertainment content changes perspective in a manner that corresponds to the movement of the viewing position 410, as discussed earlier in this disclosure. Thus, as the viewing position of the viewer's head moves to the left of center, the perspective used to render the scene rotates to the left, showing the left side of the house. This perspective is not visible in the non-DP linear 3D audiovisual entertainment content frames. As can be seen, an open treasure chest is visible to the left side of the house; the treasure chest may be additional content that was added to the DP linear 3D audiovisual entertainment content (an Easter egg). In the right-most frame 414, the perspective has been rotated around the right side of the house and the top corner of the roof of a second house has entered the lower left corner of the rendered view and the first house is now partially obscured by trees.

The following discussion examines the large amount of flexibility that may exist in how POV zones and information mapping head position changes to changes in dynamic POV origin and dynamic LOS are defined. Each of the following examples uses the same 3D virtual world as is used in, for example FIG. 3C, but with different DP-related elements.

Figure 5:
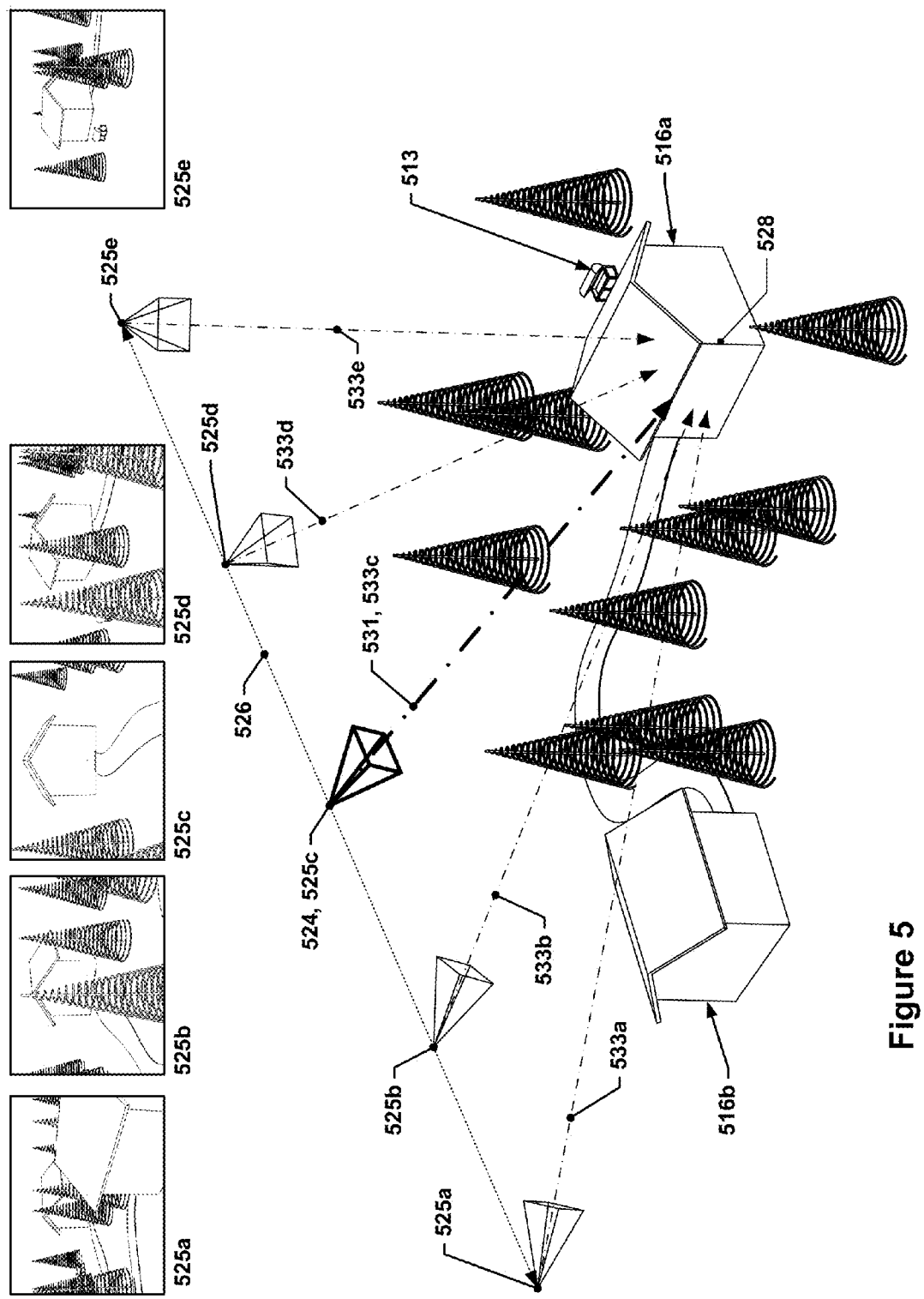
FIG. 5 depicts an off-angle three-dimensional view of the 3D workspace or virtual world of FIG. 3B, but with a different point-of-view zone.

FIG. 5 depicts an off-angle three-dimensional view of the 3D workspace or virtual world of FIG. 3B, but with a different point-of-view zone. As seen in FIG. 5, a POV zone 526 is provided that is, in effect, a straight line that passes through a default POV origin 524. As a person viewing the DP display moves their head to the left of the default viewing position, e.g., left of the center of the DP display, the information mapping such detected head movement to the movement of the dynamic POV origin may cause the dynamic POV origin to move along the POV zone 526 to positions such as dynamic POV origin 525d or 525e. Correspondingly, movement of the person's head to the right of the default viewing position may cause the dynamic POV origin to move along the POV zone 526 to positions such as dynamic POV origin 525b or 525a. In other implementations, a two-dimensional or three-dimensional POV zone may be used instead of the depicted single-dimensional POV zone.

In the depicted example, the mapping that relates the dynamic LOS 533 orientation for each of the displayed dynamic POV origins 525 includes a rule or condition that causes each dynamic LOS 533 to pass through a common focal point 528 located in the center of the house 516a. Thus, the house 516a is always in the center of the rendered view, as can be seen in the corresponding rendered scenes along the top of FIG. 5. As can be seen, objects that were not visible in from the default POV origin 524 are visible in viewpoints associated with other dynamic POV origin locations, including a second house 516b and a treasure chest Easter egg 513.

Figure 6:
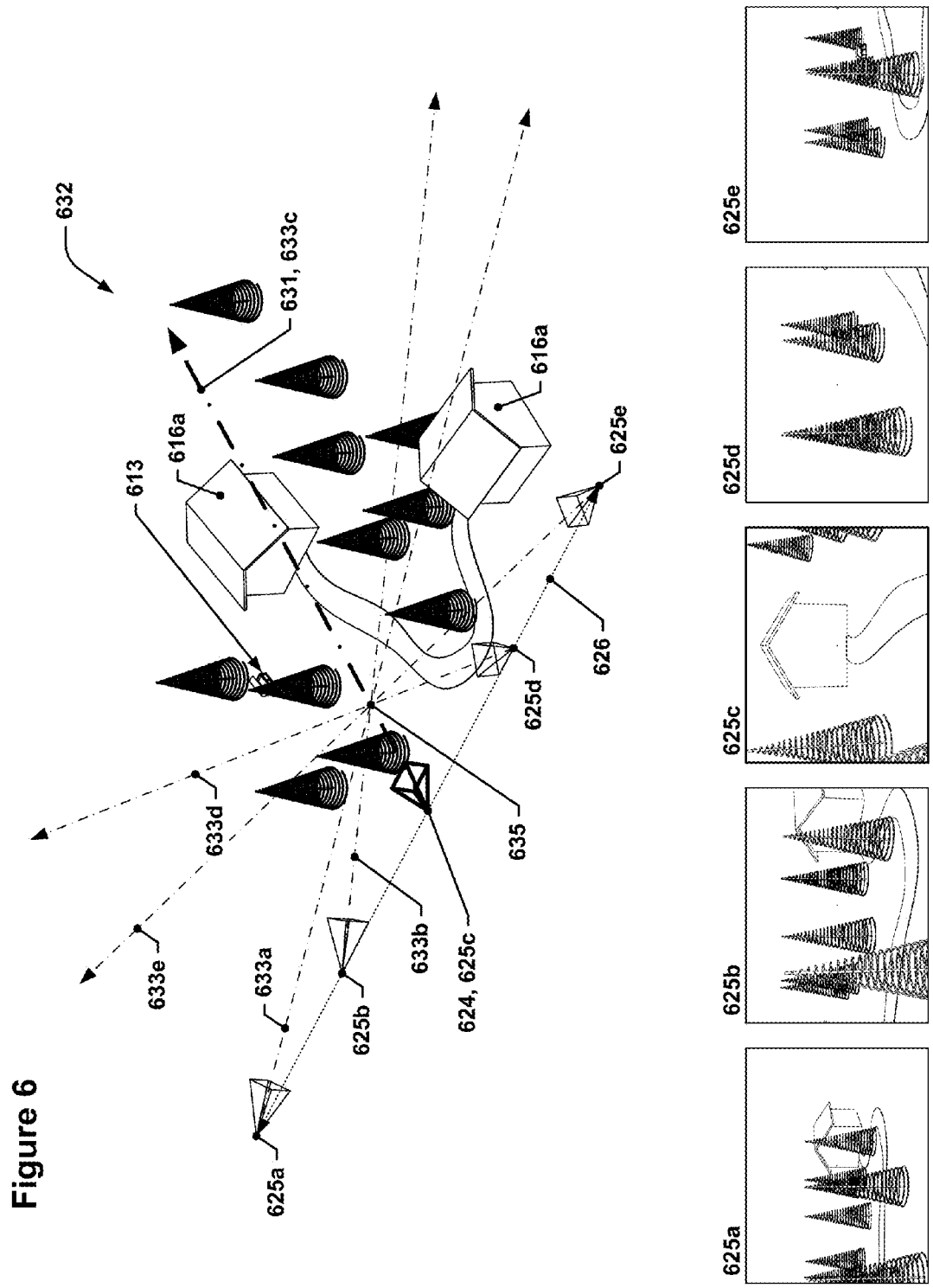
FIG. 6 depicts an off-angle three-dimensional view of the 3D workspace or virtual world of FIG. 5, but shows the effects of a different dynamic line-of-sight mapping.

FIG. 6 depicts an off-angle three-dimensional view of the 3D workspace or virtual world of FIG. 5, but shows the effects of a different dynamic line-of-sight mapping. In FIG. 6, a POV zone 626 is used that is the same as the POV zone 526 of FIG. 5, and the dynamic POV origins 625 shown correspond to the dynamic POV origins 525 shown in FIG. 5. The information mapping the dynamic LOS 633 orientation for each of the displayed dynamic POV origins 625 to the location of the corresponding dynamic POV origin 625 (or the detected viewer head position) includes a rule or a condition that causes each dynamic LOS 633 to pass through a common focal point 635 that is established at a location on the default LOS 631. This has the effect of causing each dynamic LOS 633 to pivot about the common focal point 635 as the viewer's head position moves left-of right-of center with respect to the DP display. In such an implementation, objects that are normally visible in the scene from the default POV origin 624 may swing out of view as the dynamic POV origin 625 moves left or right of the default POV origin 624. Thus, as can be seen, the house 616a that is in the center of the rendered scene from the default POV origin 624 viewpoint is not visible in either of the other four rendered scenes taken from the vantage point of the dynamic POV origins 625a/b/d/e (although a very small corner of the roof of the house 616a is partially visible at the left/right edges of the rendered views from dynamic POV origins 625b and 625d, respectively).

Figure 7:
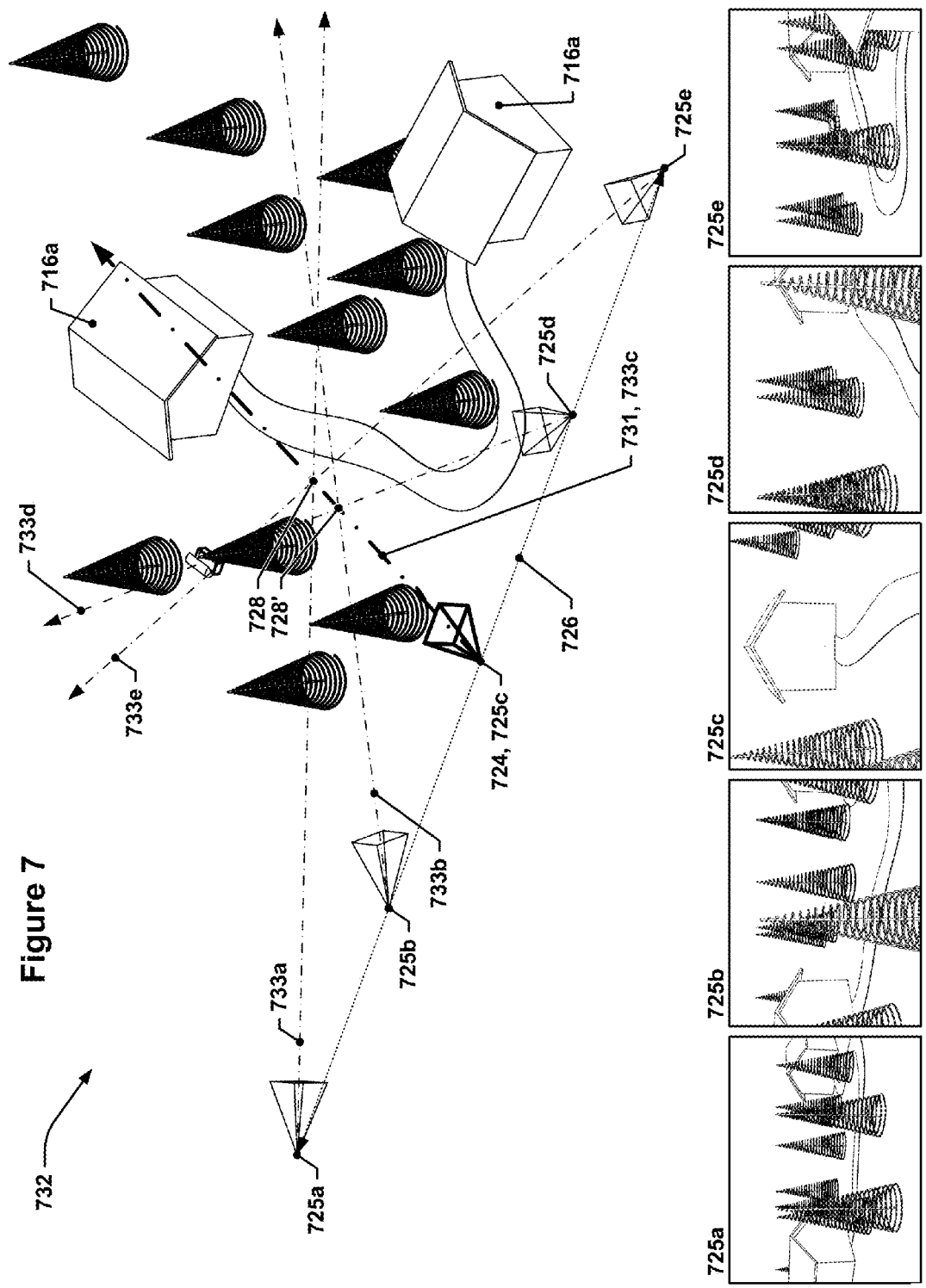
FIG. 7 also depicts an off-angle three-dimensional view of the 3D workspace or virtual world of FIG. 5, but shows the effects of another, different dynamic line-of-sight mapping.

FIG. 7 also depicts an off-angle three-dimensional view of the 3D workspace or virtual world of FIG. 5, but shows the effects of another, different dynamic line-of-sight mapping. The POV zone 726 in this example, as well as the default POV origin 724, default LOS 731, and dynamic POV origins 725a/b/c/d/e are similar to those discussed above with respect to FIGS. 5 and 6.

The information mapping the dynamic LOS 733 orientation for each of the displayed dynamic POV origins 725 to the location of the corresponding dynamic POV origin 725 (or the detected viewer head position), in this example, includes a rule or a condition that does not require each dynamic LOS to pass through a common focal point that is fixed with respect to either the virtual world or the default POV origin 724 and default LOS 731. Such rules or conditions may, for example, define the angle between the dynamic LOSs 733 and, for example, the default LOS 731, to be a function of the relative position of the dynamic POV origin 725 along the POV zone 726 (or as a function of viewer head position relative to the DP display). An alternative rule that may be used to produce the depicted example is to define a focal point 728 that the dynamic LOSs 733 pass through and to also define rules that cause the focal point 728 to move along the default LOS 731 relative to the dynamic POV origin 725 as a function of dynamic POV origin location (or of viewer head position). Thus, for example, for dynamic POV origins 725b and 725d, the corresponding dynamic LOSs 733b and 733d may pass through focal point 728', whereas for dynamic POV origins 725a and 725e, the corresponding dynamic LOSs 733a and 733e may pass through focal point 728 (in other words, the focal point may move between positions 728 and 728' (and locations therebetween) depending on where the dynamic POV origin is located.

In some implementations, the POV zone used and the information mapping the dynamic LOS to the dynamic POV origin location (or detected head position) may provide the viewer with a visual experience similar to that experienced when viewing a scene through a window while standing some distance back from the window. As the viewer moves to the left or right of the center of the window, objects on the other side of the window may become visible as the viewer moves into a position where there is direct line-of-sight to the object through the window or may disappear from view as the object becomes occluded by the environment surrounding the window (this example assumes a window in an opaque wall). This may give the viewer the illusion of "peering" into the virtual environment through a window of some sort.

It is to be understood that, in some implementations, the DP capabilities of DP linear 3D audiovisual entertainment content may persist even when the content is paused. For example, a person viewing DP linear 3D audiovisual entertainment content may not only be able to change the perspective used to view the content as it is playing back, but may also pause the content and still retain the ability to change the perspective used to render the paused scene. Such functionality may allow the viewer to more thoroughly explore a virtual environment than may be possible during active playback of the content.

The above techniques may be used or adapted to be used with any DP display, including DP displays that may be developed in the future, such as DP displays that couple dynamic perspective with additional enhancements, such as stereoscopic display functionality. The same techniques used herein may, for example, be extended to stereoscopic display systems by rendering visual scenes according to two, slightly spaced-apart points associated with the dynamic POV origin (resulting in two images of the same scene from slightly different perspectives—these two images are then used as inputs to the stereoscopic display).

It should be noted that, despite any potential references to particular computing paradigms and software tools herein, computer program instructions on which various implementations are based may correspond to any of a wide variety of programming languages, software tools and data formats, and be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, references to particular protocols herein are merely by way of example. Suitable alternatives known to those of skill in the art may be employed.

Any of the components or operations described herein may be implemented as software code to be executed by a processor using any suitable computer language such as Java, C++ or Perl, by way of example only. The software code may be stored as a series of instructions or commands on a computer-readable medium for storage and/or transmission. Suitable computer-readable media include random access memory (RAM), read only memory (ROM), a magnetic medium such as a hard-drive or a floppy disk, an optical medium such as a compact disk (CD) or DVD (digital versatile disk), flash memory, and the like. The computer-readable medium may be any combination of such storage or transmission devices. Computer-readable media encoded with the software/program code may be packaged with a compatible device such as a client device as described above or provided separately from other devices. Any such computer-readable medium may reside on or within a single computing device or an entire computer system, and may be among other computer-readable media within a system or network. A computing device such as the client devices described above may include a monitor, printer, or other suitable display for providing any of the results mentioned herein to a user.

Examples of various implementations have been illustrated in the accompanying drawings and described further in the text above. It will be understood that the discussion herein is not intended to limit the claims to the specific implementations described. On the contrary, it is intended to cover alternatives, modifications, and equivalents as may be included within the spirit and scope of the invention as defined by the appended claims. In the preceding description, numerous implementation-specific details have been set forth in order to provide a thorough understanding of the present invention. The present invention may be practiced without some or all of these implementation-specific details. In other instances, well-known process operations have not been described in detail in order not to unnecessarily obscure the present invention.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present disclosure should not be limited by any of the implementations described herein, but should be defined only in accordance with the following and later-submitted claims and their equivalents.

It will be understood that unless features in any of the above-described implementations are expressly identified as incompatible with one another or the surrounding context implies that they are mutually exclusive and not readily combinable in a complementary and/or supportive sense, the totality of this disclosure contemplates and envisions that specific features of those implementations can be selectively combined to provide one or more comprehensive, but slightly different, technical solutions. It will therefore be further appreciated that the above description has been given by way of example only and that modifications in detail may be made within the scope of the disclosure.

What is claimed is:

1. A method comprising:
    (a) defining a plurality of visual scenes for a segment of linear visual entertainment content by obtaining three-dimensional models and other animation assets used to create a non-dynamic perspective (DP) animated serial or film feature and transforming such three-dimensional models and other animation assets into a format that is renderable in real-time by a dynamic perspective graphics processing unit (DPGPU);
    (b) defining, for each visual scene, information that establishes (i) a default point-of-view (POV) origin (ii) a default line-of-sight (LOS), and (iii) a POV zone, wherein:
        the POV zone represents a region within which a dynamic POV origin is moved responsive to user input during real-time rendering of that visual scene,
        the POV zone includes the default POV origin,
        the dynamic POV origin represents a point in virtual space from which the perspective used to render that visual scene in real-time originates, and
        the perspective used to render that visual scene from the dynamic POV origin has a corresponding dynamic LOS; and
    (c) further defining information that establishes a mapping for determining the dynamic LOS that corresponds with each potential location of the dynamic POV origin within the POV zone, wherein, when the visual scene is rendered to a display in real-time by the DPGPU:
        the dynamic POV origin within the POV zone is positioned in real-time within the POV zone relative to the default POV origin in accordance with data indicating a relative location of a person's head with respect to the display,
        the visual scene is rendered in real-time using a perspective originating from the dynamic POV origin and looking along the dynamic LOS, and
        the DPGPU modifies the dynamic LOS in real-time according to the mapping and the current location of the dynamic POV origin; and
    (d) storing the segment of linear visual entertainment content, including the plurality of visual scenes and the associated information for each visual scene that establishes the default POV origin, the default LOS, the POV zone, and the mapping for determining the dynamic LOS for that visual scene, in a format that is compatible with the DPGPU.

2. The method of claim 1, further comprising inserting content into at least one of the visual scenes that is not visible when that visual scene is rendered from a perspective that corresponds with the perspective used for that scene at a corresponding point in time in the non-DP animated serial or film feature and that is visible when that visual scene is rendered from a perspective that does not correspond with the perspective used for that scene at the corresponding point in time in the non-DP animated serial or film feature.

3. The method of claim 1, wherein:
    the default POV origin and the default LOS for each visual scene are extracted from the three-dimensional models and other animation assets used to create a corresponding visual scene in the non-DP animated serial or film feature, and
    rendering each visual scene when the dynamic POV origin is located in the same location as the default POV origin results in a visual presentation of the visual scene that is substantially identical to the corresponding visual scene in the non-DP animated serial or film feature.

4. The method of claim 1, wherein the POV zone for at least one of the visual scenes is defined, at least in part, by a portion of a spherical surface.

5. The method of claim 1, wherein the POV zone for at least one of the visual scenes is defined, at least in part, by a linear path generally transverse to the default LOS.

6. The method of claim 5, wherein the mapping for determining the dynamic LOS for the at least one visual scene causes the angle between the dynamic LOS and the default LOS to increase in value as the dynamic POV origin moves along the linear path and away from the default POV origin.

7. The method of claim 1, further comprising:
    (e) providing the segment of linear visual entertainment content, in the format that is compatible with the DPGPU, to a device having the DPGPU.

8. A method comprising:
    (a) defining a plurality of visual scenes for a segment of linear visual entertainment content, wherein the linear visual entertainment content is animated content that is renderable in real-time by a dynamic perspective graphics processing unit (DPGPU);
    (b) defining, for each visual scene, information that establishes (i) a default point-of-view (POV) origin, (ii) a default line-of-sight (LOS), and (iii) a POV zone, wherein:
        the POV zone represents a region within which a dynamic POV origin is moved responsive to user input during real-time rendering of that visual scene,
        the POV zone includes the default POV origin,
        the dynamic POV origin represents a point in virtual space from which the perspective used to render that visual scene in real-time originates, and
        the perspective used to render that visual scene from the dynamic POV origin has a corresponding dynamic LOS; and
    (c) further defining information that establishes a mapping for determining the dynamic LOS that corresponds with each potential location of the dynamic POV origin within the POV zone, wherein, when the visual scene is rendered to a display in real-time by the DPGPU:
        the dynamic POV origin within the POV zone is positioned in real-time within the POV zone relative to the default POV origin in accordance with data indicating user input specifying a two- or three-dimensional coordinate,
        the visual scene is rendered in real-time using a perspective originating from the dynamic POV origin and looking along the dynamic LOS, and the DPGPU modifies the dynamic LOS in real-time according to the mapping and the current location of the dynamic POV origin; and (d) storing the segment of linear visual entertainment content, including the plurality of visual scenes and the associated information for each visual scene that establishes the default POV origin, the default LOS, the POV zone, and the mapping for determining the dynamic LOS for that visual scene.

9. The method of claim 8, wherein the segment of linear visual entertainment content, including the plurality of visual scenes and the associated information for each visual scene that establishes the default POV origin, the default LOS, the POV zone, and the mapping for determining the dynamic LOS for that visual scene, is stored in a format that is compatible with the DPGPU.

10. The method of claim 8, wherein defining the plurality of visual scenes for the segment of linear visual entertainment content comprises obtaining three-dimensional models and other animation assets used to create a non-dynamic perspective (DP) animated serial or film feature and transforming such three-dimensional models and other animation assets into the format compatible with the DPGPU.

11. The method of claim 10, further comprising inserting additional content into at least one of the visual scenes that is not visible when that visual scene is rendered from a perspective that corresponds with the perspective used for that scene at a corresponding point in time in the non-DP animated serial or film feature.

12. The method of claim 11, wherein:
the linear visual entertainment content is configured to register when the perspective used to display one or more of the visual scenes causes some or all of the additional content to be visible on the display, and
the linear visual entertainment content is configured to track the number of instances of additional content that are visibly rendered on the display during the course of linear visual entertainment content playback.

13. The method of claim 10, wherein:
the default POV origin and the default LOS for each visual scene are extracted from the three-dimensional models and other animation assets used to create a corresponding visual scene in the animated serial or film feature, and
rendering each visual scene when the dynamic POV origin is located in the same location as the default POV origin results in a visual presentation of the visual scene that is substantially identical to the corresponding visual scene in the animated serial or film feature.

14. The method of claim 8, wherein the POV zone for at least one of the visual scenes is defined, at least in part, by a portion of a spherical surface.

15. The method of claim 8, further comprising:
(e) providing the segment of linear visual entertainment content, in the format that is compatible with the DPGPU, to a device having the DPGPU.

16. The method of claim 8, wherein
defining the default POV origin for each of the visual scenes comprises defining one or more locations where the default POV origin is located during the visual scene.

17. The method of claim 16, wherein:
the default LOS passes through the default POV origin and a focal point that travels along a motion path during the visual scene.

18. The method of claim 16, wherein:
the one or more locations where the default POV origin is located during the visual scene are defined according to a motion path.

19. The method of claim 16, wherein:
the default LOS passes through the default POV origin and a focal point that travels along a first motion path during the visual scene, and
the one or more locations where the default POV origin is located during the visual scene are defined according to a second motion path.

20. The method of claim 8, wherein the data indicating user input specifying a two- or three-dimensional coordinate is data obtained from a spatial head-tracking sensor that tracks the relative position of a person's head with respect to the display.

21. A non-transitory, computer-readable medium storing computer-executable instructions for controlling one or more computing devices to:
(a) obtain data defining a plurality of visual scenes for a segment of linear visual entertainment content, wherein the linear visual entertainment content is animated content that is renderable in real-time by a dynamic perspective graphics processing unit (DPGPU);
(b) receive, for each visual scene, data defining information that establishes (i) a default point-of-view (POV) origin, (ii) a default line-of-sight (LOS), and (iii) a POV zone, wherein:
the POV zone represents a region within which a dynamic POV origin is moved responsive to user input during real-time rendering of that visual scene,
the POV zone includes the default POV origin,
the dynamic POV origin represents a point in virtual space from which the perspective used to render that visual scene in real-time originates, and
the perspective used to render that visual scene from the dynamic POV origin has a corresponding dynamic LOS; and
(c) further receive, for each visual scene, information that establishes a mapping for determining the dynamic LOS that corresponds with each potential location of the dynamic POV origin within the POV zone, wherein, when the visual scene is rendered in real-time to a display by the DPGPU:
the dynamic POV origin within the POV zone is positioned in real-time within the POV zone relative to the default POV origin in accordance with data indicating user input specifying a two- or three-dimensional coordinate,
the visual scene is rendered in real-time using a perspective originating from the dynamic POV origin and looking along the dynamic LOS, and
the DPGPU modifies the dynamic LOS in real-time according to the mapping and the current location of the dynamic POV origin; and
(d) store the segment of linear visual entertainment content, including the plurality of visual scenes and the associated information for each visual scene that establishes the default POV origin, the default LOS, the POV zone, and the mapping for determining the dynamic LOS for that visual scene.

22. The non-transitory, computer-readable medium of claim 21, wherein the segment of linear visual entertainment content, including the plurality of visual scenes and the associated information for each visual scene that establishes the default POV origin, the default LOS, the POV zone, and the mapping for determining the dynamic LOS for that visual scene, is stored in a format that is compatible with the DPGPU.

23. The non-transitory, computer-readable medium of claim 21, wherein the non-transitory, computer-readable medium stores further computer-executable instructions for controlling the one or more computing devices to:
   obtain the data defining the plurality of visual scenes for the segment of linear visual entertainment content by importing 3D assets used to create a segment of non-DP linear visual entertainment content; and
   extract the data defining the default POV origins and the default LOS for each visual scene from the focal point and POV origin of corresponding virtual cameras in the imported 3D assets.

24. The non-transitory, computer-readable medium of claim 23, wherein the non-transitory, computer-readable medium stores further computer-executable instructions for controlling the one or more computing devices to:
   automatically define the POV zone and the information that establishes a mapping for determining the dynamic LOS that corresponds with each potential location of the dynamic POV origin within the POV zone according to pre-established rules or settings.

* * * * *